United States Patent [19]

Basile

[11] 4,201,312

[45] May 6, 1980

[54] PRESSURE COOKER CLOSURE FASTENING MEANS

[76] Inventor: Pedro Basile, Rua Pelotas, 183,, São Paulo, Brazil

[21] Appl. No.: 916,139

[22] Filed: Jun. 16, 1978

[30] Foreign Application Priority Data

Sep. 26, 1977 [BR] Brazil .................................. 7706389

[51] Int. Cl.² .......................................... B65D 45/28
[52] U.S. Cl. .................................... 220/314; 220/316
[58] Field of Search ............... 220/314, 316, 250, 251, 220/206; 292/259 R

[56] References Cited

U.S. PATENT DOCUMENTS 1,436,427 11/1922 Banks .................................. 220/314

Primary Examiner—George T. Hall
Attorney, Agent, or Firm—Cesari and McKenna

[57] ABSTRACT

A closure for a pressure cooker pot which includes a lid with a lateral keyway in the center, and a standpipe fixed to the lid, a key fitting in the keyway and removable lid locking means fixed to the key and reacting between the key and the pot. A pressure regulator when in position on the standpipe prevents the separation of the locking means from the lid by blocking the removal of the key.

4 Claims, 4 Drawing Figures

PRESSURE COOKER CLOSURE FASTENING MEANS

BACKGROUND OF THE INVENTION

Pressure cookers have long been used to quick-cook foods by means of superheated steam under pressure. This invention relates to an improved pressure cooker closure.

Pressue cookers generally have a pot, a lid, means for removably locking the lid to the pot, a pressur relief standpipe on the lid and a pressure regulator seated upon the standpipe to control the pressure in the pot.

One problem that has occurred with pressure cookers in the past is that when the locking means is released and the lid removed from the pot, the locking means and the lid would separate, with the lid often falling on the floor. When the lid falls, it sometimes becomes bent out of shape. If the lid is so deformed, it may not make an air tight seal with the rim of the pot and the pressure cooker may not work properly.

Another problem with pressure cookers is that the lid locking means is not always properly attached to the pot prior to use. This can result in the lid becoming forcefully disengaged from the pot while the pressure cooker is being heated.

SUMMARY OF THE INVENTION

It is an object of the present invention to provide a closure for a pressure cooker which prevents the separation of the removable lid locking means from the lid when the closure is removed from the pot.

It is another object of the present invention to provide a pressure cooker closure which is readily secured to the cooker pot.

Briefly, the closure for a pressure cooker described in this application includes a lid having a lateral keyway formed in the center thereof and a vertical standpipe fixed to the lid adjacent the lateral keyway providing a vent passage through the lid. There is also a key removably engaged in the keyway which is attached to locking means for removably locking the lid to the pot. The locking means reacts between the key and parts of the pot to provide a fluid-tight closure for the pot.

When a conventional pressure regulator is positioned on the standpipe, the key cannot slip out of the keyway thus preventing the separation of the lid from the locking means when the closure is removed from the pot.

The lid also has a plurality of ridges which assist in the proper positioning of the locking means when fitting the closure on the pot.

BRIEF DESCRIPTION OF THE DRAWINGS

Although the aspects and features of this invention which are considered to be novel are expressed in the appended claims, further details as to preferred practices and as to the further objects and features thereof may be more readily comprehended through reference to the following description of the preferred embodiment, taken in connection with the accompanying drawings, wherein:

DESCRIPTION OF THE PREFERRED EMBODIMENT

Figure 1:
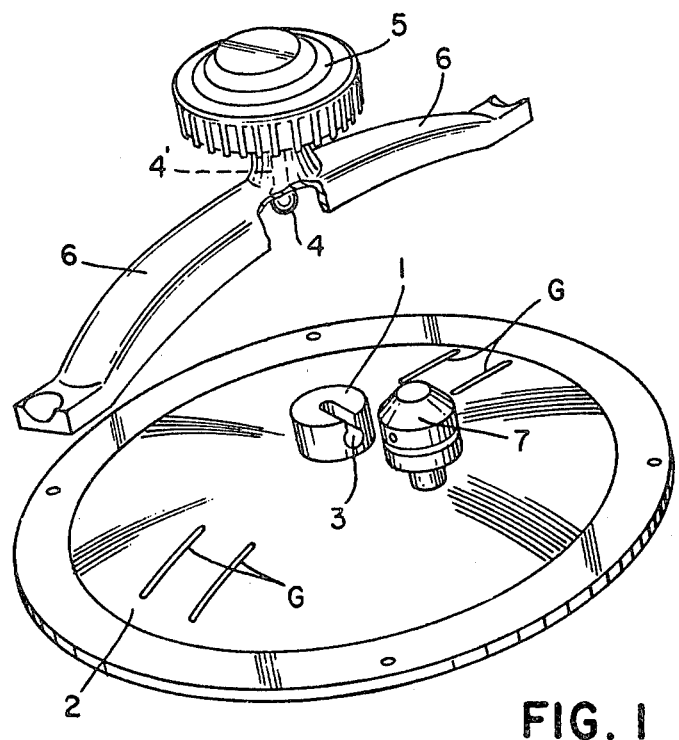
FIG. 1 is an exploded perspective view of the improved pressure cooker closure.

Referring to FIG. 1, the present closure includes a lid 2 having a raised portion 1 in the center. The raised portion, in turn, has a lateral keyway 3. The closure also includes lid locking means comprising a beam 6, a knob 5 attached to a threaded axle 4' which screws into an internally threaded passage at the center of the beam 6. Attached to the other end of axle 4' is a key 4 arranged to interfit with the keyway 3.

Figure 4:
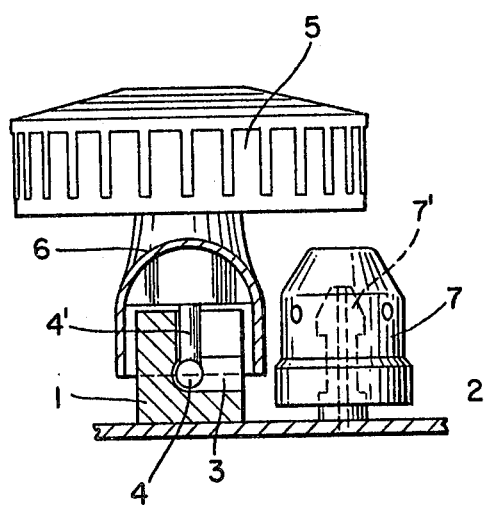

Looking at FIG. 4, we see that there is a standpipe 7' which projects up from the lid 2 adjacent the keyway 1. The standpipe forms a vent passage through the lid 2. A standard weighted pressure regulator 7 rests upon the standpipe 7' when the cooker is in use.

Figure 2:
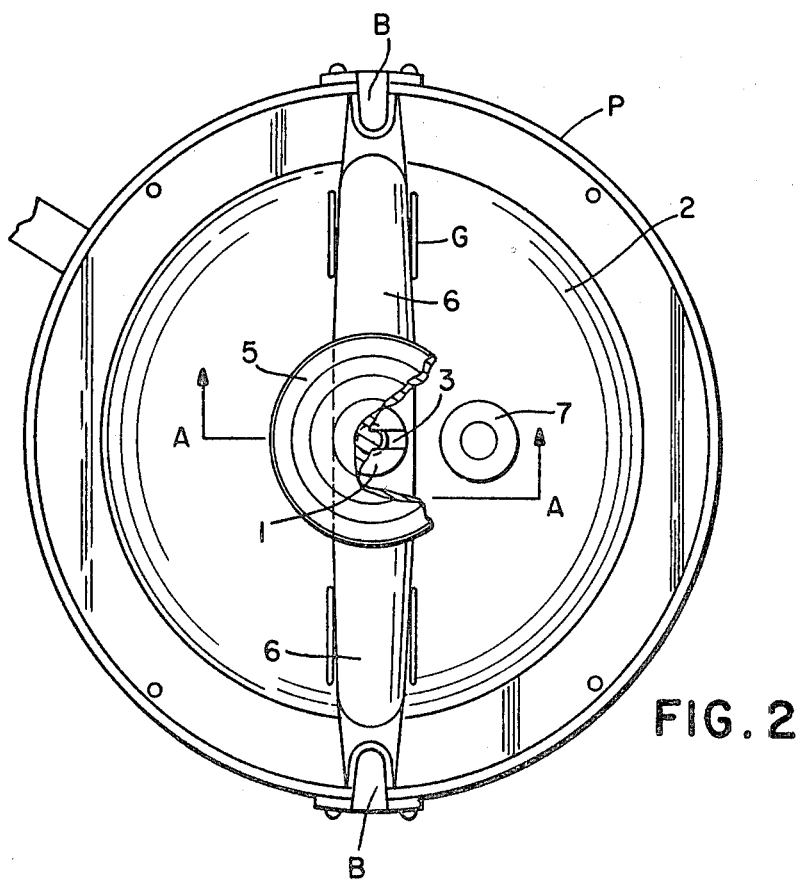
FIG. 2 is a top plan view of the FIG. 1 closure secured to a pressure cooker pot.
Figure 3:
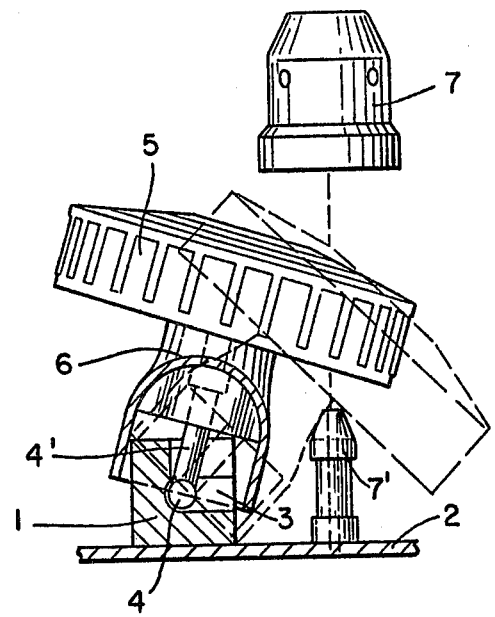
FIGS. 3 and 4 are sectional views along line A—A of FIG. 2 on a larger scale showing the FIG. 1 closure in greater detail.

Looking now at FIGS. 1 to 3, to assemble the closure, with the pressure regulator 7 removed from the standpipe 7', key 4 is slid laterally into keyway 3. To accomplish this, beam 6 is tilted to its dotted line position in FIG. 3 so that the side wall of beam 6 clears raised portion 1 permitting key 4 to slide into keyway 3 as the beam 6 is tilted back to its solid line position in FIG. 3. The pressure regulator is then placed on the standpipe 7' as shown in FIG. 4 thus preventing beam 6 from tilting to its dotted line position thereby preventing the separation of the lid and the locking means. Next the pressure cooker closure is slid on the pot P under the pot brackets B, with beam 6 being positioned under brackets B. Ridges 8 formed in lid 2 are used to help center the beam on the lid. The knob 5 is then turned sufficiently so that the beam 6 moves up against the undersides of brackets B while the axle 4' and the key 4 push down on lid portion 1, thus locking the lid in place.

To remove the closure from the pressure cooker pot, the pressure cooker is first removed from the heat and allowed to cool completely to relived the pressure in the pot. Immediate relief can be obtained by removing the pressure regulator 7 from the standpipe 7'. With the pressure regulator 7 in position on standpipe 7', the knob 5 is turned to disengage the beam 6 from the brackets B. The entire closure is then slid laterally from the pot P, knob 5 being used as a handle. Throughout this process, key 4 remains engaged in keyway 3 so that there is no likelihood of the lid 2 separating from the beam 6 and falling on the floor.

What I claim is:

1. A closure for a pressure cooker comprising a lid, lid locking means and interfitting means attached to said locking means and arranged to be removably attached to said lid and means for preventing detachment of said interfitting means from said lid, said interfitting means including a key attached to said locking means and a lateral keyway formed at the center of the lid, said key engaging in said keyway, and said preventing means including a standpipe projecting up from said lid adjacent said keyway forming a vent passage through said lid and a pressure regulator which sits on said standpipe, said regulator preventing the removal of said key from said keyway as long as it is in position on said standpipe.

2. A closure for a pressure cooker as defined in claim 1 wherein said locking means reacts between said pressure cooker pot and said keyway.

3. A closure for a pressure cooker as defined in claim 2 wherein said locking means includes a beam having a threaded passage in its center a threaded axle screwing into said passage, a knob affixed to the upper end of said axle, said key being affixed to the lower end of said axle.

4. A closure for a pressure cooker as defined in claim 3 and further comprising means formed in said lid for centering said beam on the lid to facilitate locking the lid to said pressure cooker pot.

* * * * *